United States Patent
Payne et al.

(10) Patent No.: US 7,605,737 B2
(45) Date of Patent: Oct. 20, 2009

(54) DATA ENCODING IN A CLOCKED DATA INTERFACE

(75) Inventors: Robert F. Payne, Lucas, TX (US); Richard M. Prentice, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/696,486

(22) Filed: Apr. 4, 2007

(65) Prior Publication Data
US 2008/0219380 A1 Sep. 11, 2008

Related U.S. Application Data

(60) Provisional application No. 60/893,751, filed on Mar. 8, 2007.

(51) Int. Cl.
*H03M 1/12* (2006.01)

(52) U.S. Cl. .................. 341/155; 341/61; 341/160; 341/174; 375/247; 375/316; 375/240.01; 375/240.06

(58) Field of Classification Search .............. 341/63, 341/155, 174; 375/247, 316, 355, 240.1, 375/240.26
See application file for complete search history.

(56) References Cited

U.S. PATENT DOCUMENTS

| 4,438,298 | A | | 3/1984 | Rubin | |
|---|---|---|---|---|---|
| 5,065,107 | A | * | 11/1991 | Kumar et al. | 329/308 |
| 5,504,774 | A | * | 4/1996 | Takai et al. | 375/134 |
| 5,790,171 | A | * | 8/1998 | Klopfer et al. | 725/147 |
| 5,808,573 | A | * | 9/1998 | Shih et al. | 341/110 |
| 5,859,669 | A | | 1/1999 | Prentice | |
| 5,936,968 | A | * | 8/1999 | Lyons | 370/503 |
| 6,008,680 | A | | 12/1999 | Kyles et al. | |
| 6,154,508 | A | * | 11/2000 | Ott | 375/354 |
| 6,542,552 | B1 | | 4/2003 | Yoshikawa et al. | |
| 6,810,046 | B2 | * | 10/2004 | Abbas et al. | 370/545 |
| 6,816,328 | B2 | * | 11/2004 | Rae | 360/51 |
| 6,952,174 | B2 | * | 10/2005 | Madsen et al. | 341/63 |
| 7,203,224 | B2 | * | 4/2007 | Scott et al. | 375/220 |
| 7,295,578 | B1 | * | 11/2007 | Lyle et al. | 370/503 |
| 2001/0021307 | A1 | * | 9/2001 | Wang et al. | 386/96 |
| 2002/0021519 | A1 | * | 2/2002 | Rae | 360/51 |
| 2003/0091124 | A1 | * | 5/2003 | Gupta et al. | 375/316 |

(Continued)

OTHER PUBLICATIONS

Lee W. Young, authorized officer, International Searching Authority (ISA/US), Notification of Transmittal of the International Search Report and the Written Opinion of the International Searching Authority, or the Declaration, date of mailing Nov. 10, 2008, International Application No. PCT/US 08/56290, International Filing Date Mar. 7, 2008.

*Primary Examiner*—Linh V Nguyen
(74) *Attorney, Agent, or Firm*—John J. Patti; Wade J. Brady, III; Frederick J. Telecky, Jr.

(57) ABSTRACT

One embodiment of the present invention includes a data transmission system. The system comprises a data transmitter that provides a plurality of data bits over at least one data line. The data transmitter comprises a clock that provides a clock signal associated with timing for latching the plurality of data bits and a data encoder configured to encode error data associated with the data transmission system in the clock signal.

18 Claims, 3 Drawing Sheets

U.S. PATENT DOCUMENTS

2003/0223502 A1* 12/2003 Madsen et al. .............. 375/247
2004/0086051 A1* 5/2004 Mizoguchi ............. 375/240.28
2005/0122335 A1 6/2005 MacInnis et al.
2006/0045020 A1* 3/2006 Picco et al. ................. 370/249
2006/0238908 A1* 10/2006 Looijkens et al. ........... 359/885

* cited by examiner

DATA ENCODING IN A CLOCKED DATA INTERFACE

RELATED APPLICATIONS

The present invention claims priority from U.S. Provisional Patent Application No. 60/893,751, filed Mar. 8, 2007 the entire contents of which is hereby incorporated by reference.

TECHNICAL FIELD

This invention relates to electronic circuits, and more specifically to data encoding in a clocked data interface.

BACKGROUND

The demand for communications systems, such as network, computer, and/or wireless solutions, is constantly increasing. As a result, electronic devices that incorporate integrated circuits (ICs) are continually designed to operate at greater speeds with more efficiency. In a given electronic device, many interconnected ICs are designed to operate and communicate with each other based on very specific timing. As a result, the operation of different components in an electronic device can be synchronized for fast and efficient operation. In addition, as the amount of data that is transferred between two or more integrated circuits increases, data can be organized into data frames, such that data can be transferred in both a serial and parallel manner at higher data rates, such as double-data rate (DDR), triple-data rate, (TDR), or more.

In a high data-rate data transmission system, a data receiver may require synchronization information from a data transmitter from which the data is provided. For example, the data receiver may require a clock signal to synchronize timing between the two ends of a data link that interconnects the data transmitter and the data receiver. As another example, the data receiver may also require a synchronization bit that signifies the beginning and/or end of a data frame. As such, the data corresponding to the most significant bits (MSBs) and the least significant bits (LSBs) can be ordered to properly reassemble the data.

In the example of a high data-rate interface system, an amount of data that is transmitted from the data transmitter to the data receiver is limited to an amount of conductors of the data link that interconnects the data transmitter and the data receiver, as well as the frequency of the synchronization signals. It is often desirable to transmit ancillary information, such as control signals indicative of performance, status, and/or format between the devices in the data transmission system. Transmission of such ancillary information over the existing data lines can greatly sacrifice the high-speed data transfer performance of the data transmission system. However, the addition of one or more signal lines between the data transmitter and the data receiver can result in additional cost and/or can violate spatial requirements for minimizing the size of electronic devices.

SUMMARY

One embodiment of the present invention includes a data transmission system. The system comprises a data transmitter that provides a plurality of data bits over at least one data line. The data transmitter comprises a clock that provides a clock signal associated with timing for latching the plurality of data bits and a data encoder configured to encode ancillary data associated with the data transmission system in the clock signal.

Another embodiment of the present invention includes a method for encoding data in a clocked digital interface. The method comprises converting an analog signal into a first set of digital data and encoding a second set of digital data into a data synchronization signal. The method also comprises transmitting a plurality of digital data signals associated with the first digital data and the data synchronization signal across a respective plurality of conductors to a data receiver.

Another embodiment of the present invention includes a data transmission system. The system comprises means for transmitting data arranged in a data frame in a plurality of digital data signals and means for encoding additional data in a frame signal. The frame signal can be configured to define a beginning of the data frame. The system further comprises means for latching data from the plurality of digital data signals based on a clock signal and the frame signal and means for decoding the additional data from the frame signal based on the clock signal.

DETAILED DESCRIPTION

The present invention relates to electronic circuits, and more specifically to data encoding in a clocked data interface. In a data transmission system, a data transmitter transmits data across a plurality of data lines to a data receiver, along with at least one synchronization signal. The data that is transmitted can be organized into data frames. The synchronization signal includes a clock signal, and can also include a frame signal. The data frames can be defined based on a rising-edge of the clock signal or a frame signal. The data transmitter can also encode additional data into the at least one synchronization signal. The encoding of data into the synchronization signal can include encoding logic states based on a location of a falling-edge of the clock signal or the frame signal within the data frame. The location of the falling-edge can be determined at the data receiver based on comparing a rising-edge of the clock signal with a logic state of the encoded data synchronization signal. As a result, ancillary data, such as control signals or error signals, can be transmitted without increasing a number of data lines in the data transmission system.

Figure 1:
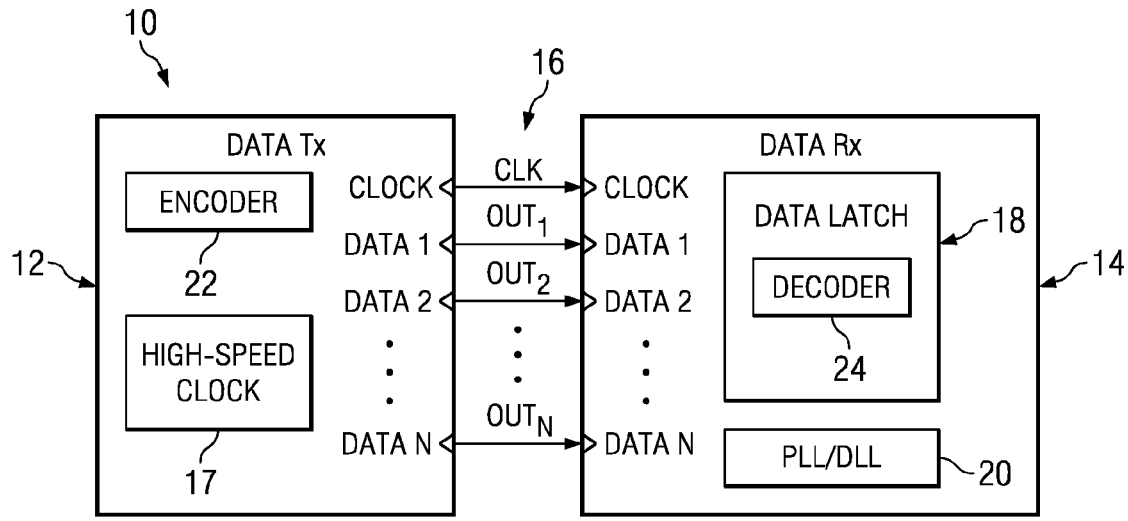
FIG. 1 illustrates an example of a data transmission system in accordance with an aspect of the invention.

FIG. 1 illustrates an example of a data transmission system 10 in accordance with an aspect of the invention. The data transmission system 10 includes a data transmitter 12 configured to transmit digital data signals to a data receiver 14. The data transmitter 12 can be any of a variety of devices configured to transmit data at a high data rate, such as an analogto-digital converter (ADC). In addition, the data transmitter 12 and the data receiver 14 can each be configured as or included in integrated circuits (ICs). In the example of FIG. 1, the data transmitter 12 provides signals to the data receiver 14 across a plurality of data lines 16. Specifically, the data transmitter 12 provides a clock signal CLK to the data receiver 14, as well as a plurality N of data signals, where N is a positive integer greater than zero. The data transmitter 12 can include a high-speed clock 17 configured to generate the clock signal CLK. In the example of FIG. 1, the data signals are labeled $OUT_1$ through $OUT_N$. Each of the data signals can include consecutive serial data, such that the data that is transmitted from the data transmitter 12 to the data receiver 14 can be organized into data frames, as demonstrated in greater detail below. Therefore, the data transmitter 12 provides a data interface to the data receiver 14.

The data receiver 14 includes a data latch 18. Upon the data receiver 14 receiving the clock signal CLK and the data signals $OUT_1$ through $OUT_N$, the data latch 18 latches the data from the data signals $OUT_1$ through $OUT_N$ based on the clock signal CLK. In addition, a data frame of data can be defined by the clock signal CLK. As described herein, a data frame can include multiple serial bits of data that are transmitted in the data signals $OUT_1$ through $OUT_N$ in parallel with respect to each other. As an example, a beginning of a data frame can be signaled to the data receiver 14 at each rising-edge of the clock signal CLK, such that each of the data signals $OUT_1$ through $OUT_N$ can carry multiple bits of data during a single data frame.

The data receiver 14 also includes a phase-locked loop (PLL) or a delay-locked loop (DLL), demonstrated in the example of FIG. 1 as PLL/DLL 20. The PLL/DLL 20 is configured to provide multiple delayed rising-edges of the clock signal CLK, such that each of the delayed rising-edges can be utilized by the data latch 18 to latch each consecutive bit of data that is included in each of the data signals $OUT_1$ through $OUT_N$. As a result, the rising-edge of the clock signal CLK can define the data frames, and the delayed rising-edges of the clock signal CLK provided by the PLL/DLL 20 can consecutively latch the data across the duration of the data frame. Upon latching the multiple bits of data from each of the data signals $OUT_1$ through $OUT_N$, the data receiver 14 can reorder the data into an order of least significant bits (LSBs) to most significant bits (MSBs). Thus, the data can be properly reassembled, such as in a serial sequence.

Figure 2:
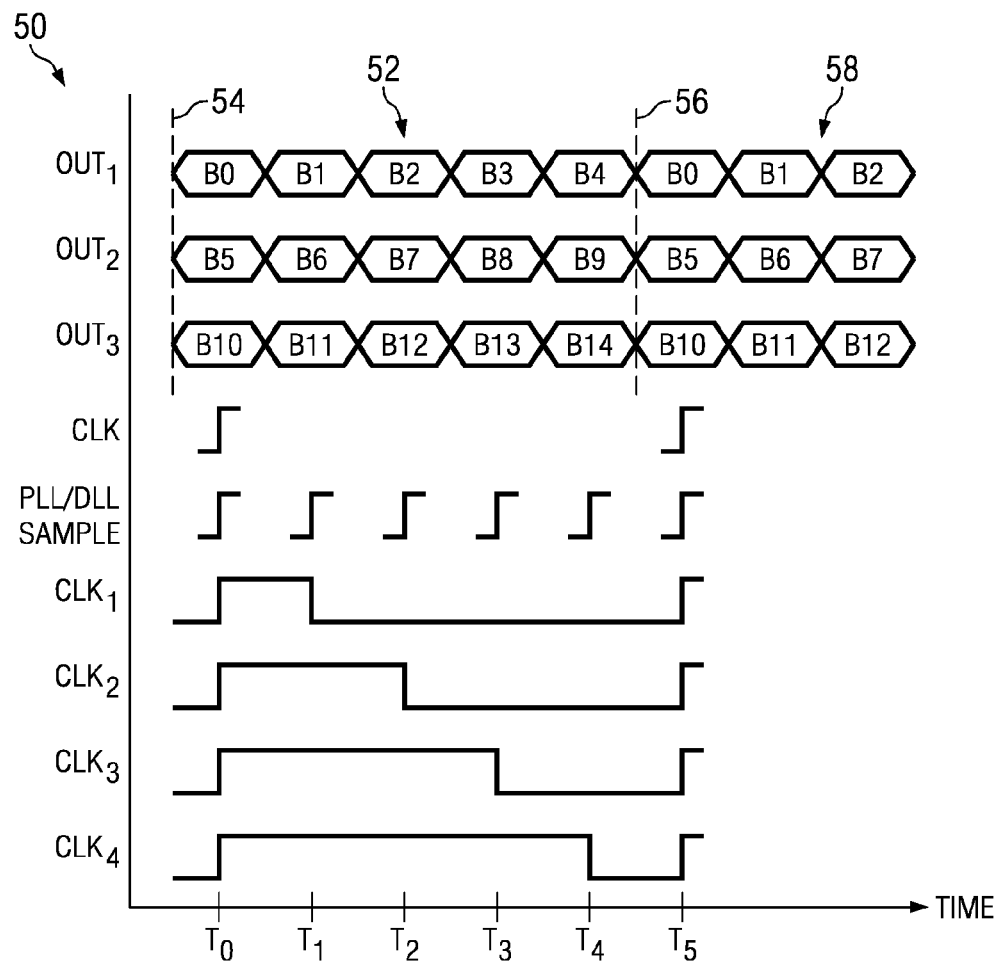
FIG. 2 illustrates an example of a timing diagram associated with the data transmission system of FIG. 1 in accordance with an aspect of the invention.

FIG. 2 illustrates an example of a timing diagram 50 associated with the data transmission system 10 of the example of FIG. 1 in accordance with an aspect of the invention. The timing diagram 50 demonstrates three digital data signals $OUT_1$ through $OUT_3$. The digital data signals $OUT_1$ through $OUT_3$ carry bits of data labeled B0 through B14, ordered from LSB to MSB, with the bits being arranged in a data frame 52. In the example of FIG. 2, dashed lines 54 and 56 demonstrate the beginning and the end of the data frame 52, respectively, with the dashed line 56 also demonstrating the beginning of a next data frame 58. During the data frame 52, the digital data signal $OUT_1$ serially transmits bits B0 through B4, the digital data signal $OUT_2$ serially transmits bits B5 through B9, and the digital data signal $OUT_3$ serially transmits bits B10 through B14. Therefore, the data frame 52 is a 15-bit data frame, as can also be the data frame 58 and subsequent data frames.

At a time $T_0$, the clock signal CLK has a rising-edge which defines the beginning of the data frame 52 with respect to the data receiver 14. The PLL/DLL 20 thus generates a plurality of delayed rising-edges for which the data latch 18 can latch the bits from the digital data signals $OUT_1$ through $OUT_3$, as demonstrated in the example of FIG. 2 by PLL/DLL SAMPLE. In the example of FIG. 2, the data latch 18 latches bits B0, B5, and B10 from the digital data signals $OUT_1$, $OUT_2$, and $OUT_3$, respectively, at the time $T_0$. It is to be understood that, because the clock signal CLK has a rising-edge at the time $T_0$, the data latch 18 could latch these bits with the rising-edge of the clock signal CLK itself, as opposed to a rising-edge generated by the PLL/DLL 20. In a similar manner, bits B1, B6, and B11 are latched at a time $T_1$, bits B2, B7, and B12 are latched at a time $T_2$, bits B3, B8, and B13 are latched at a time $T_3$, and bits B4, B9, and B14 are latched at a time $T_4$. At a time $T_5$, the clock signal CLK has another rising-edge, which signals to the data receiver 14 the end of the data frame 52 and the beginning of the next data frame 58. Thus, at the time $T_5$, the data receiver 14 can reorder the latched data bits B0 through B14 from LSB to MSB.

Referring back to the example of FIG. 1, the data transmitter 12 includes an encoder 22. The encoder 22 is configured to communicate with the high-speed clock 17 to encode additional data into the clock signal CLK, such that the additional data can include one or more additional bits of data transmitted to the data receiver 14. The additional data can include one or more control, error, and/or indicator signals, or can represent data transfer that is an addition to the data that is transmitted on the digital data signals $OUT_1$ through $OUT_N$.

As an example, because the clock signal CLK in the data transmission system 10 is configured to define the beginning of a data frame at a rising-edge, such that the falling-edge is not used to latch data, the falling-edge of the clock signal CLK can be implemented by the encoder 22 to encode the additional data. For example, the additional data can be encoded based on a location of the falling-edge of the clock signal CLK within a given data frame. Therefore, the duty cycle of the clock signal CLK relative to the data frame 52 can be adjusted based on the additional data encoded therein. The data latch 18 includes a decoder 24 configured to decode the additional data in the clock signal CLK. For example, the decoder 24 can compare each of the delayed rising-edges generated by the PLL/DLL 20 with a logic state of the clock signal CLK to decode the additional data.

Referring back to the example of FIG. 2, the timing diagram 50 demonstrates signals $CLK_1$ through $CLK_4$. The signals $CLK_1$ through $CLK_4$ represent the clock signal CLK with four separate possible locations for a falling-edge based on the additional data that is encoded therein. For example, the signal $CLK_1$ can represent the clock signal CLK having a falling-edge at the time $T_1$, thus representing a first logic state (e.g., 00) encoded within based on having an approximately 20% duty cycle. The signal $CLK_2$ can represent the clock signal CLK having a falling-edge at the time $T_2$, thus representing a second logic state (e.g., 01) encoded within based on having an approximately 40% duty cycle. The signal $CLK_3$ can represent the clock signal CLK having a falling-edge at the time $T_3$, thus representing a third logic state (e.g., 10) encoded within based on having an approximately 60% duty cycle. The signal $CLK_4$ can represent the clock signal CLK having a falling-edge at the time $T_4$, thus representing a fourth logic state (e.g., 11) encoded within based on having an approximately 80% duty cycle. The PLL/DLL SAMPLE signals can thus be employed by the decoder 24 to determine the location of the falling-edge of the clock signal CLK by sampling the clock signal CLK at each of the times $T_1$ through $T_4$. It is to be understood that the possible falling-edge times of the clock signal CLK could occur slightly before or slightly after the times of the PLL/DLL delayed rising-edges to avoid violating setup and hold time restrictions.

As a result of the encoding of the additional data in the clock signal CLK, the data transmitter 12 can transmit additional information, such as control, error, and/or status information, to the data receiver 14 without adding additional data lines 16 and without interrupting performance of the data transfer. It is to be understood that the data transmission system 10 is not limited to the example of FIGS. 1 and 2. For example, the duration of the data frame 52 is not limited to five serial bits per digital signal, but can include more or less bits. In addition, the data transmission system 10 is not limited to three digital data signals, but that the data transmission system 10 can include more or less signals, as well. Therefore, the number of bits transmitted in each data frame can vary from that demonstrated in the examples of FIGS. 1 and 2.

Figure 3:
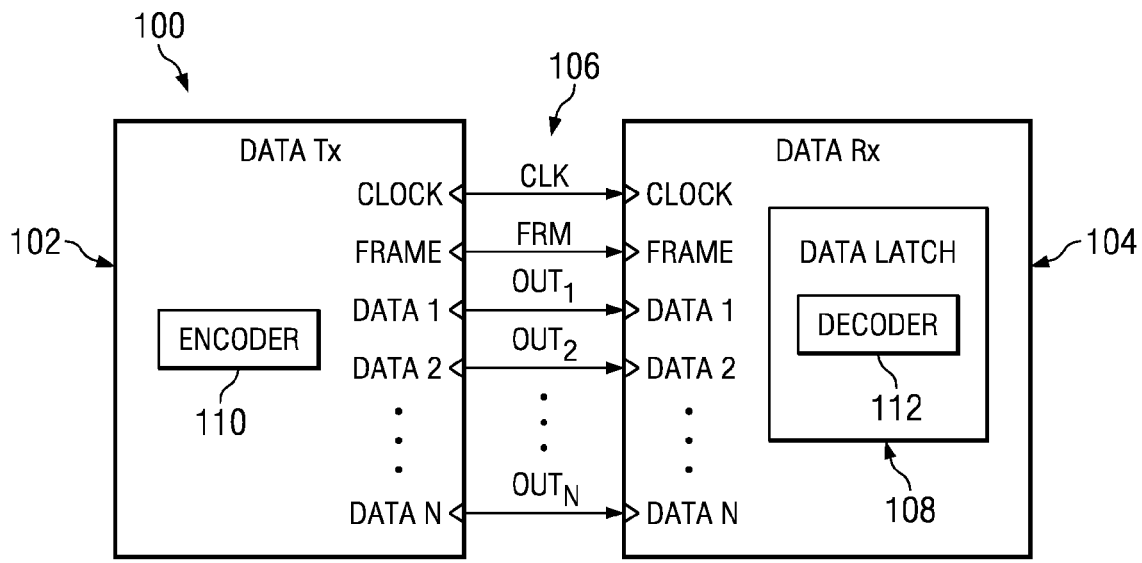
FIG. 3 illustrates another example of a data transmission system in accordance with an aspect of the invention.

FIG. 3 illustrates an example of a data transmission system 100 in accordance with an aspect of the invention. The data transmission system 100 includes a data transmitter 102 configured to transmit digital data signals to a data receiver 104. The data transmitter 102 can be any of a variety of devices configured to transmit data at a high data rate, such as an ADC. In addition, the data transmitter 102 and the data receiver 104 can each be configured as ICs. In the example of FIG. 3, the data transmitter 102 provides signals to the data receiver 104 across a plurality of data lines 106. Specifically, the data transmitter 102 provides a clock signal CLK, such as generated from a high-speed clock (not shown), and a frame signal FRM to the data receiver 104, as well as a plurality N of data signals, where N is a positive integer greater than zero. In the example of FIG. 3, the data signals are labeled $OUT_1$ through $OUT_N$. Similar to as described above regarding the example of FIG. 1, each of the data signals can include consecutive serial data, such that the data that is transmitted from the data transmitter 102 to the data receiver 104 can be organized into data frames.

The data receiver 104 includes a data latch 108. Upon the data receiver 104 receiving the clock signal CLK, the frame signal FRM, and the data signals $OUT_1$ through $OUT_N$, the data latch 108 latches the data from the data signals $OUT_1$ through $OUT_N$ based on the clock signal CLK. In addition, a data frame of data can be defined by the frame signal FRM. Therefore, the data latch 108 can be configured to latch the data from each of the data signals $OUT_1$ through $OUT_N$ at each rising-edge and each falling-edge of the clock signal CLK, such that the clock signal CLK has a fixed duty cycle that is approximately equal to the data rate of the data transmitted on each of the data signals $OUT_1$ through $OUT_N$. Upon latching the multiple bits of data from each of the data signals $OUT_1$ through $OUT_N$, the data receiver 104 can thus reorder the data into an order of LSBs to MSBs. Accordingly, unlike the data receiver 14 in the example of FIG. 1, the data receiver 104 in the example of FIG. 3 does not include a PLL/DLL.

Figure 4:
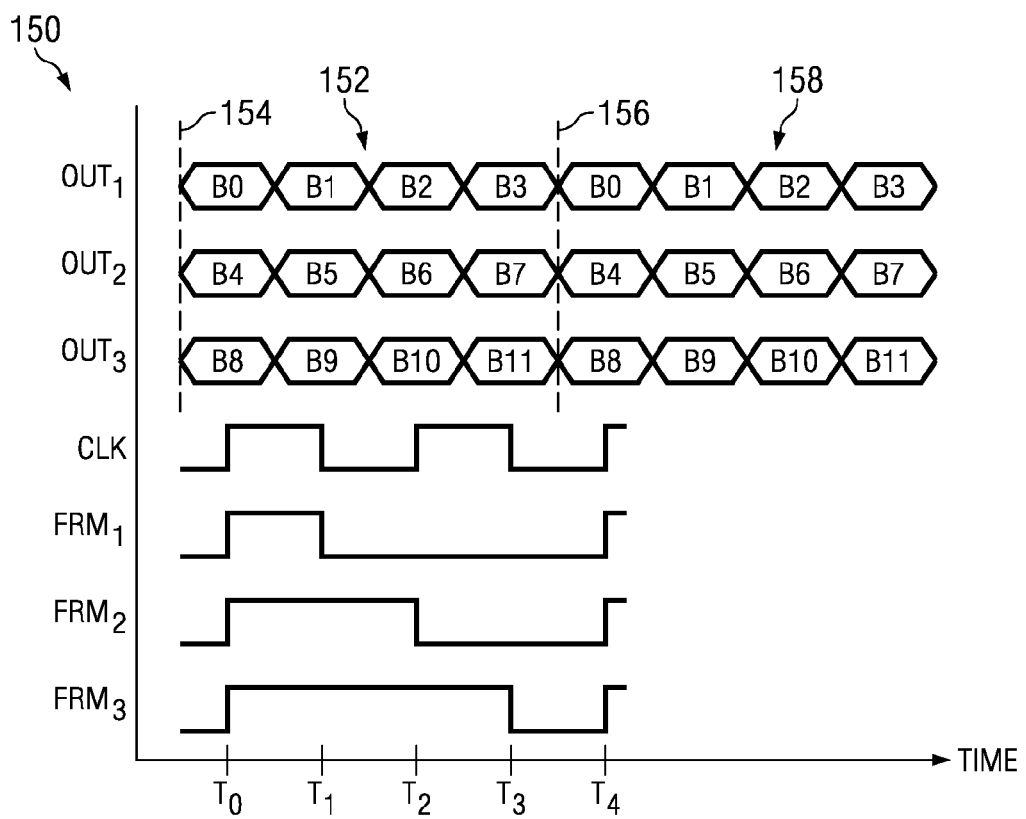
FIG. 4 illustrates an example of a timing diagram associated with the data transmission system of FIG. 3 in accordance with an aspect of the invention.

FIG. 4 illustrates an example of a timing diagram 150 associated with the data transmission system 100 of the example of FIG. 3 in accordance with an aspect of the invention. The timing diagram 150 demonstrates three digital data signals $OUT_1$ through $OUT_3$. The digital data signals $OUT_1$ through $OUT_3$ carry bits of data labeled B0 through B11, ordered from LSB to MSB, with the bits being arranged in a data frame 152. In the example of FIG. 4, dashed lines 154 and 156 demonstrate the beginning and the end of the data frame 152, respectively, with the dashed line 156 also demonstrating the beginning of a next data frame 158. During the data frame 152, the digital data signal $OUT_1$ serially transmits bits B0 through B3, the digital data signal $OUT_2$ serially transmits bits B4 through B7, and the digital data signal $OUT_3$ serially transmits bits B8 through B11. Therefore, the data frame 152 is a 12-bit data frame, as can also be the data frame 58 and subsequent data frames.

At a time $T_0$, the frame signal FRM has a rising-edge which defines the beginning of the data frame 152 with respect to the data receiver 104. The data latch 108 can thus latch the bits from the digital data signals $OUT_1$ through $OUT_3$ at each rising-edge and each falling-edge of the clock signal CLK. In the example of FIG. 4, the data latch 108 latches bits B0, B4, and B8 from the digital data signals $OUT_1$, $OUT_2$, and $OUT_3$, respectively, at the time $T_0$. In a similar manner, bits B1, B5, and B9 are latched at a time $T_1$, bits B2, B6, and B10 are latched at a time $T_2$, and bits B3, B7, and B11 are latched at a time $T_3$. At a time $T_4$, the frame signal FRM has another rising-edge, which signals to the data receiver 104 the end of the data frame 152 and the beginning of the next data frame 158. Thus, at the time $T_4$, the data receiver 104 can reorder the latched data bits B0 through B11 from LSB to MSB.

Referring back to the example of FIG. 3, the data transmitter 102 includes an encoder 110. The encoder 110 is configured to encode additional data into the frame signal FRM, such that the additional data can include one or more additional bits of data transmitted to the data receiver 104. Specifically, similar to as described above regarding the example of FIGS. 1 and 2, a location of the falling-edge of the frame signal FRM within the data frame can be implemented by the encoder 110 to encode the additional data. The data latch 108 includes a decoder 112 configured to decode the additional data in the frame signal FRM. For example, the decoder 112 can compare each of the rising-edges of the clock signal CLK with a logic state of the frame signal FRM to decode the additional data.

Referring back to the example of FIG. 4, the timing diagram 150 demonstrates signals $FRM_1$ through $FRM_3$. The signals $FRM_1$ through $FRM_3$ represent the frame signal FRM with three separate possible locations for a falling-edge based on the additional data that is encoded therein. For example, the signal $FRM_1$ can represent the frame signal FRM having a falling-edge at the time $T_1$, thus representing a first logic state encoded within based on having an approximately 25% duty cycle. The signal $FRM_2$ can represent the frame signal FRM having a falling-edge at the time $T_2$, thus representing a second logic state encoded within based on having an approximately 50% duty cycle. The signal $FRM_3$ can represent the frame signal FRM having a falling-edge at the time $T_3$, thus representing a third logic state encoded within based on having an approximately 75% duty cycle. The three possible logic states of the additional data in the example of FIG. 4 can thus represent three of the four logic states 00, 01, 10, and 11. The clock signal CLK can thus be employed by the decoder 112 to determine the location of the falling-edge of the frame signal FRM by sampling the frame signal FRM at each of the times $T_1$ through $T_3$. It is to be understood that the possible falling-edge times of the frame signal FRM could occur slightly before or slightly after the times of the rising-edges of the clock signal CLK to avoid violating setup and hold time restrictions.

As a result of the encoding of the additional data in the frame signal FRM, the data transmitter 102 can transmit additional information, such as control, error, and/or status information, to the data receiver 104 without adding additional data lines 106 and without interrupting performance of the data transfer. It is to be understood that the data transmission system 100 is not limited to the example of FIGS. 3 and 4. For example, the duration of the data frame 152 is not limited to four serial bits per digital signal, but can include more or less bits. Therefore, the possible duty cycles and thus logic states of the additional data can depend on the number of serial bits per digital signal in a given data frame. In addition, the data transmission system 100 is not limited to three digital data signals, but that the data transmission system 100 can include more or less signals, as well. Therefore, the number of bits transmitted in each data frame can vary from that demonstrated in the examples of FIGS. 3 and 4.

Figure 5:
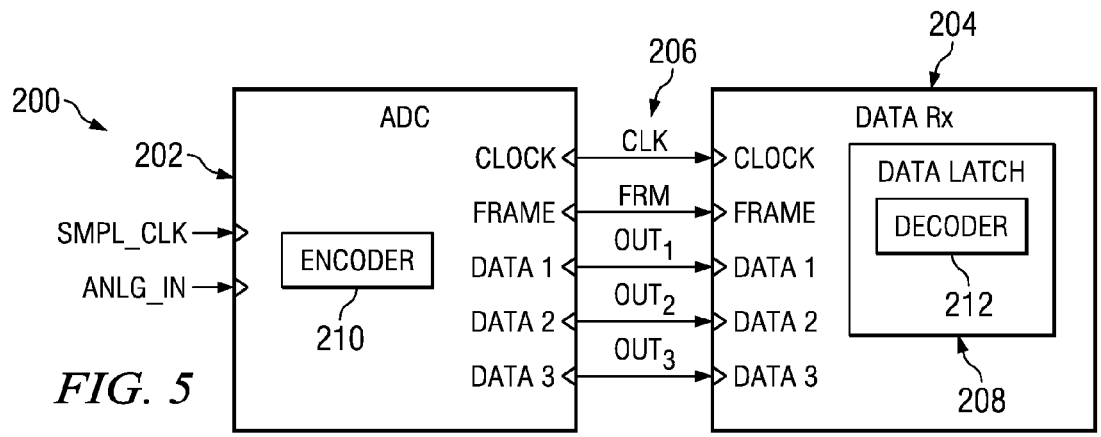
FIG. 5 illustrates another example of a data transmission system in accordance with an aspect of the invention.

FIG. 5 illustrates an example of a data transmission system 200 in accordance with an aspect of the invention. The data transmission system 200 includes an analog-to-digital converter (ADC) 202, which could be an IC, configured to receive an analog input signal ANLG_IN and a sampling clock signal SMPL_CLK, and to convert the analog input signal ANLG_IN into a digital form. Specifically, the ADC 202 converts the analog input signal ANLG_IN into three digital data signals $OUT_1$, $OUT_2$, and $OUT_3$ that are transmitted to a data receiver 204 across a plurality of data lines 206.

The ADC 202 provides a clock signal CLK, such as generated from a high-speed clock (not shown), and a frame signal FRM as synchronization signals to the data receiver 204, such that the data that is transmitted to the data receiver 204 can be organized into data frames. The data receiver 204 can thus latch the data from the digital data signals $OUT_1$, $OUT_2$, and $OUT_3$ using a data latch 208 based on rising and falling-edges of the fixed duty cycle clock signal CLK in a data frame defined by a rising-edge of the frame signal FRM, similar to as described above in the example of FIGS. 3 and 4. Therefore, the data receiver 204 can reorder the bits of the converted digital data (e.g., 12-bits) into an order of LSBs to MSBs.

Figure 6:
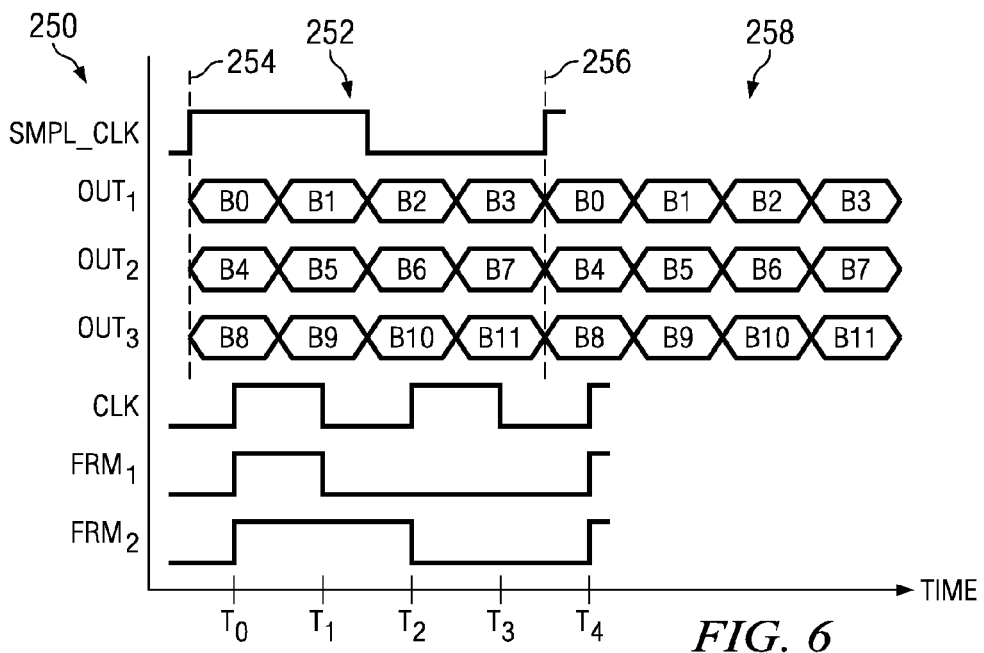
FIG. 6 illustrates an example of a timing diagram associated with the data transmission system of FIG. 5 in accordance with an aspect of the invention.

FIG. 6 illustrates an example of a timing diagram 250 associated with the data transmission system 200 of the example of FIG. 5 in accordance with an aspect of the invention. The timing diagram 250 demonstrates the three digital data signals $OUT_1$ through $OUT_3$ carrying bits of data labeled B0 through B11 arranged in a data frame 252. In the example of FIG. 6, dashed lines 254 and 256 demonstrate the beginning and the end of the data frame 252, respectively, with the dashed line 256 also demonstrating the beginning of a next data frame 258. During the data frame 252, the digital data signal $OUT_1$ serially transmits bits B0 through B3, the digital data signal $OUT_2$ serially transmits bits B4 through B7, and the digital data signal $OUT_3$ serially transmits bits B8 through B11.

At a time $T_0$, the frame signal FRM has a rising-edge which defines the beginning of the data frame 252 with respect to the data receiver 204. The data latch 208 can thus latch the bits from the digital data signals $OUT_1$ through $OUT_3$ at each rising-edge and each falling-edge of the clock signal CLK. In the example of FIG. 6, the data latch 208 latches bits B0, B4, and B8 from the digital data signals $OUT_1$, $OUT_2$, and $OUT_3$, respectively, at the time $T_0$. In a similar manner, bits B1, B5, and B9 are latched at a time $T_1$, bits B2, B6, and B10 are latched at a time $T_2$, and bits B3, B7, and B11 are latched at a time $T_3$. At a time $T_4$, the frame signal FRM has another rising-edge, which signals to the data receiver 204 the end of the data frame 252 and the beginning of the next data frame 258. Thus, at the time $T_4$, the data receiver 204 can reorder the latched data bits B0 through B11 from LSB to MSB to generate a 12-bit representation of the analog input signal ANLG_IN sampled over a period of the sample clock SMPL_CLK.

Referring back to the example of FIG. 5, the data transmitter 202 includes an encoder 210 configured to encode additional data into the frame signal FRM. As an example, the additional data can be an error signal provided to the data receiver 204, such as to indicate a voltage overflow of the analog input signal ANLG_IN. For example, the voltage overflow can provide indication to the data receiver 204 that a given sample of the analog input signal ANLG_IN has a voltage potential that is greater than a predefined limit. A location of the falling-edge of the frame signal FRM within the data frame can be implemented by the encoder 210 to encode the voltage overflow condition error signal. The data latch 208 includes a decoder 212 configured to decode the additional data in the frame signal FRM. For example, the decoder 212 can compare each of the rising-edges of the clock signal CLK with a logic state of the frame signal FRM to decode the error signal.

Referring back to the example of FIG. 6, the timing diagram 150 demonstrates signals $FRM_1$ and $FRM_2$. The signals $FRM_1$ and $FRM_2$ represent the frame signal FRM with two separate possible locations for a falling-edge based on the state of the error signal that is encoded therein. For example, the signal $FRM_1$ can represent the frame signal FRM having a falling-edge at the time $T_1$, thus representing a first logic state encoded within based on having an approximately 25% duty cycle. The first logic state can be indicative that there is no voltage overflow condition, and thus normal operation, for the analog sample represented in the data frame 252. The signal $FRM_2$ can represent the frame signal FRM having a falling-edge at the time $T_2$, thus representing a second logic state encoded within based on having an approximately 50% duty cycle. The second logic state can be indicative that there is a voltage overflow condition for the analog sample represented in the data frame 252. Therefore, for example, the data receiver 204 can provide a feedback signal or other corrective signal in response to the voltage overflow condition associated with the decoded error signal based on the 50% duty cycle of the frame signal FRM relative to the data frame 252.

It is to be understood that the data transmission system 200 is not limited to the example of FIGS. 5 and 6. For example, the duration of the data frame 252 is not limited to four serial bits per digital signal, but can include more or less bits. Therefore, the possible duty cycles and thus logic states of the additional data can depend on the number of serial bits per digital signal in a given data frame. In addition, the data transmission system 200 is not limited to three digital data signals, but that the data transmission system 200 can include more or less signals, as well. Furthermore, an analog-to-digital conversion is but one implementation for encoding additional data in a clocked data interface.

Figure 7:
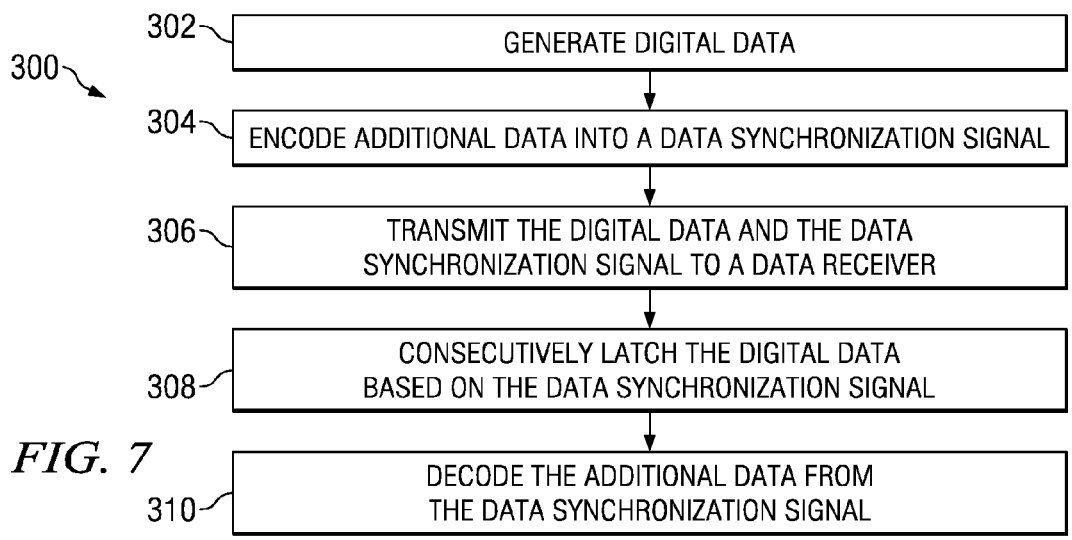
FIG. 7 illustrates a method for encoding data in a clocked digital interface in accordance with an aspect of the invention.

In view of the foregoing structural and functional features described above, certain methods will be better appreciated with reference to FIG. 7. It is to be understood and appreciated that the illustrated actions, in other embodiments, may occur in different orders and/or concurrently with other actions. Moreover, not all illustrated features may be required to implement a method.

FIG. 7 illustrates a method 300 for encoding data in a clocked digital interface in accordance with an aspect of the invention. At 302, digital data is generated. The digital data can be converted analog data, such as resulting from analog-to-digital conversion. At 304, additional data is encoded into a data synchronization signal. The data synchronization signal can be a clock signal, or can be a frame signal that synchronizes data in conjunction with a clock signal. The encoding of the additional data can be based on a location of a falling-edge of the data synchronization signal with a data frame that is defined by the data synchronization signal. At 306, the digital data and the data synchronization signal are transmitted to a data receiver.

At 308, the digital data is consecutively latched within the data frame based on the data synchronization signal. As an example, rising and falling-edges of the clock signal can be used to consecutively latch the data, as well as delayed rising-edges of the clock signal generated from a PLL or a DLL. At 310, the additional data is decoded from the data synchronization signal. The additional data can be decoded based on comparing rising-edges of the clock signal with a logic state of the data synchronization signal in which the additional data is encoded to determine a location of the falling-edge of the data synchronization signal with in the data frame.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A data transmission system comprising:
   a data transmitter that provides a plurality of data bits over at least one data line, the data transmitter comprising:
   a clock that provides a clock signal associated with timing for latching the plurality of data bits; and
   a data encoder configured to encode error data associated with the data transmission system in the clock signal;
   wherein the clock signal is configured to define a beginning of a data frame associated with the plurality of data bits based on a rising-edge of the clock signal, and wherein the data receiver comprises one of a phase-locked loop and a delay-locked loop configured to provide a plurality of delayed rising-edges of the clock signal to consecutively latch the plurality of data bits within the data frame from the at least one data line.

2. The system of claim 1, further comprising a data receiver configured to latch the plurality of data bits based on the timing of the clock signal.

3. The system of claim 1, wherein the error data is encoded in the clock signal based on a location of a falling-edge of the clock signal within the data frame.

4. The system of claim 3, wherein the location of the falling-edge of the clock signal is determined based on comparing each of the plurality of delayed rising-edges of the clock signal with a logic state of the clock signal.

5. The system of claim 1, wherein the plurality of data bits are arranged in a data frame, and wherein the error data is encoded in the clock signal based on a duty cycle of the clock signal being one of 25% and 50% of the duration of the data frame.

6. The system of claim 1, wherein the data transmitter is an analog-to-digital convener (ADC).

7. The system of claim 6, wherein the error data is configured to indicate a voltage overflow condition associated with an analog signal that is provided to the ADC.

8. A method for encoding data in a clocked digital interface, the method comprising:
   converting an analog signal into a first set of digital data;
   encoding a second set of digital data into a data synchronization signal in a frame signal configured to define a beginning of a data frame based on a rising-edge of the frame signal;
   transmitting a plurality of digital data signals associated with the first digital data and the data synchronization signal across a respective plurality of conductors to a data receiver.

9. The method of claim 8, further comprising:
   consecutively latching the first set of digital data associated with the data frame from the plurality of digital data signals based on the data synchronization signal; and
   decoding the second set of digital data from the data synchronization signal.

10. The method of claim 9, wherein encoding the second set of digital data in the data synchronization signal comprises encoding the second set of digital data in a clock signal.

11. The method of claim 10, further comprising defining a beginning of the data frame associated with the first set of digital data based on a rising-edge of the clock signal, and wherein consecutively latching the first set of digital data comprises generating a plurality of delayed rising-edges of the clock signal to consecutively latch the first set of digital data from each of the plurality of digital data signals within the data frame.

12. The method of claim 8, wherein the second set of digital data is a subset of the first set of digital data.

13. The method of claim 8, wherein encoding the second set of digital data in the data synchronization signal comprises encoding the second set of digital data in the data synchronization signal based on a location of a falling-edge of the data synchronization signal within a data frame.

14. The method of claim 8, wherein decoding the second set of digital data comprises comparing a rising-edge of a clock signal with a logic state of the data synchronization signal.

15. A data transmission system comprising:
   means for transmitting data arranged in a data frame in a plurality of digital data signals;
   means for encoding additional data in a frame signal, the frame signal being configured to define a beginning of the data frame;
   means for latching data from the plurality of digital data signals based on a clock signal and the frame signal; and
   means for decoding the additional data from the frame signal based on the clock signal.

16. The system of claim 15, wherein the additional data is encoded in the frame signal based on a location of a falling-edge of the frame signal within the data frame.

17. The system of claim 15, wherein the additional data comprises a control signal encoded into the frame signal based on a duty cycle of the frame signal being set to one of 25% and 50% relative to the data frame.

18. The system of claim 17, wherein the control signal is an error signal configured to indicate a voltage overflow condition associated with an analog signal that is provided to an analog-to-digital converter (ADC).

* * * * *